US012456356B2

(12) United States Patent
Lachman

(10) Patent No.: US 12,456,356 B2
(45) Date of Patent: Oct. 28, 2025

(54) MOBILE ALARM DEVICE

(71) Applicant: Janet Lachman, Queens Village, NY (US)

(72) Inventor: Janet Lachman, Queens Village, NY (US)

( * ) Notice: Subject to any disclaimer, the term of this patent is extended or adjusted under 35 U.S.C. 154(b) by 77 days.

(21) Appl. No.: 18/589,771

(22) Filed: Feb. 28, 2024

(65) Prior Publication Data

US 2025/0273058 A1 Aug. 28, 2025

(51) Int. Cl.
*A43C 19/00* (2006.01)
*G08B 7/06* (2006.01)

(52) U.S. Cl.
CPC ................ *G08B 7/06* (2013.01); *A43C 19/00* (2013.01)

(58) Field of Classification Search
CPC .................................. G08B 7/06; A43C 19/00
See application file for complete search history.

(56) References Cited

U.S. PATENT DOCUMENTS 5,329,432 A * 7/1994 Bland ...................... A43B 3/36 36/137
5,394,312 A * 2/1995 Bland .................... A43B 23/26 36/137
2021/0145111 A1* 5/2021 Chen ..................... H02J 50/001
2025/0143412 A1* 5/2025 Tokuda .................. G09B 21/00

FOREIGN PATENT DOCUMENTS

GB 2525374 A * 10/2015 ............. A43B 3/122
WO WO-9408115 A1 * 4/1994 ......... E05B 73/0017
WO WO-2024024205 A1 * 2/2024 ............. A43C 19/00

* cited by examiner

*Primary Examiner* — An T Nguyen
(74) *Attorney, Agent, or Firm* — Kenneth Brooks

(57) ABSTRACT

A rechargeable mobile alarm device can include: a fastening button attached to a housing, the fastening button being constructed and arranged to be inserted into a button hole in footwear to fasten the housing to the footwear; a circuit board mounted on the housing; one or more light sources, one or more sirens, a first push button, and a second push button mounted on the circuit board, the first push button being electrically connected to at least a first light source and at least a first siren, the second push button being electrically connected to at least a second light source; one or more rechargeable batteries electrically connected to the one or more light sources and the one or more sirens; one or more processors electrically connected to the first push button, the second push button, the one or more light sources, and the one or more sirens.

20 Claims, 4 Drawing Sheets

MOBILE ALARM DEVICE

TECHNICAL FIELD

The embodiments generally relate to the field of mobile alarm devices.

BACKGROUND

A mobile alarm device can typically be attached to a keychain that can be kept by a user in a backpack, handbag, etc. However, when threatened by a potential attacker, a user may have difficulty quickly locating their keychain with the attached mobile alarm device, which delays the user's activation of the mobile alarm device.

There is a need for a mobile alarm device that can be mounted onto footwear so that the mobile alarm device is readily accessible by a user.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

In general, the mobile alarm device can include: a fastening button attached to a housing, the fastening button being constructed and arranged to be inserted into a button hole in footwear to fasten the housing to the footwear; a circuit board mounted on the housing; one or more light sources, one or more sirens, a first push button, and a second push button mounted on the circuit board, the first push button being electrically connected to at least a first light source and at least a first siren, the second push button being electrically connected to at least a second light source; one or more batteries electrically connected to the one or more light sources and the one or more sirens; one or more processors electrically connected to the first push button, the second push button, the one or more light sources, and the one or more sirens.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

Figure 1:
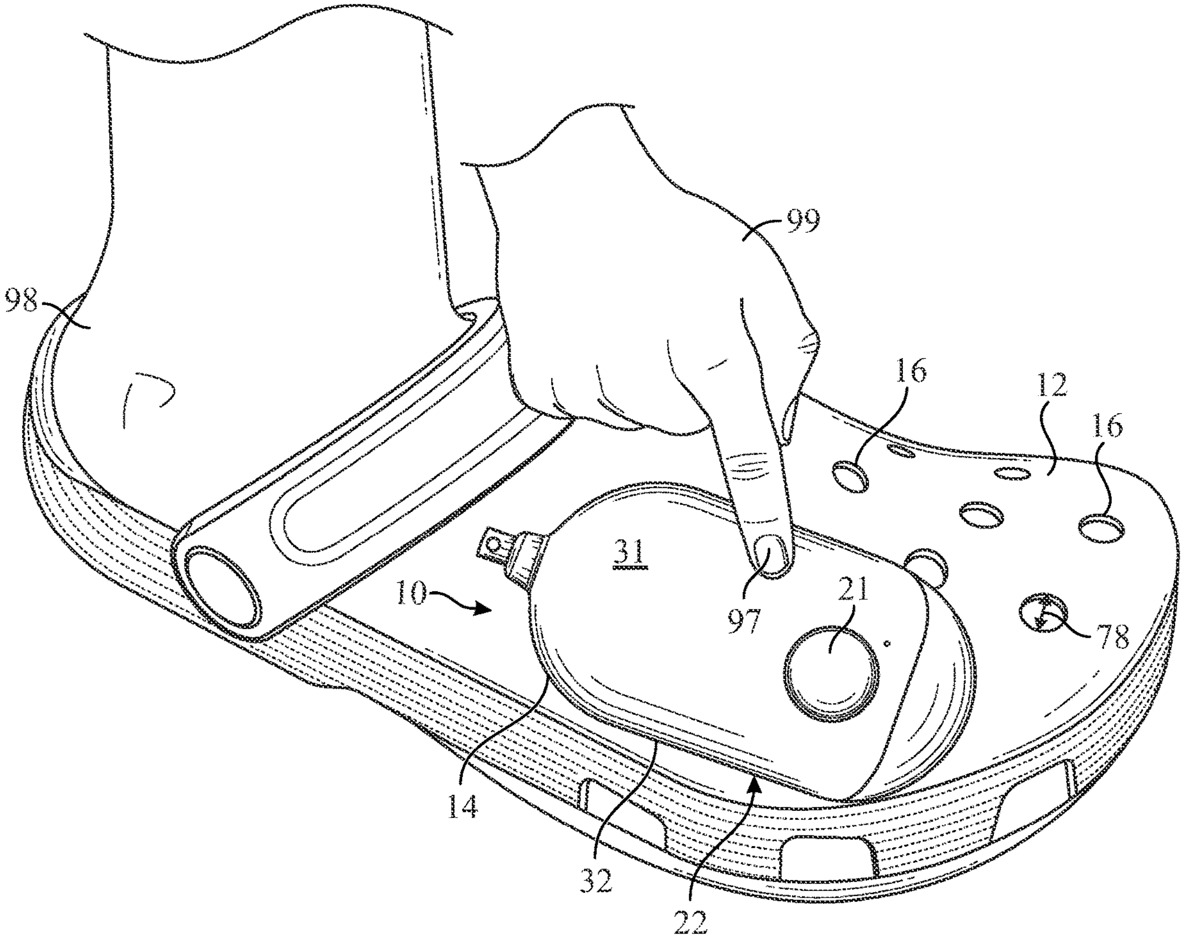
FIG. 1 illustrates a mobile alarm device fastened to footwear worn by a user, according to some embodiments disclosed herein.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are to the described product or methods of use. Any specific details of the embodiments are used for demonstration purposes only and no unnecessary limitations or inferences are to be understood from there.

It is noted that the embodiments reside primarily in combinations of components and procedures related to the products. Accordingly, the product and components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments described herein relate to a mobile alarm device that can be fastened to footwear by inserting a fastening button of the mobile alarm device into a button hole in the footwear, the button hole having a predetermined diameter. The fastening button can be constructed and arranged to fasten the mobile alarm device to the footwear while the footwear is worn by a user and while the user walks, runs, or performs other physical activities. While the mobile alarm device is fastened to the footwear of a user, the user is more quickly able to locate the mobile alarm device fastened on their footwear, and activate a siren, a light source, or a combination thereof by pushing a push button of the mobile alarm device.

The footwear can be any suitable footwear with through holes that can be used as button holes. In some embodiments, the footwear can include CROCS®, clogs, slippers, sandals, shoes, and any other suitable footwear having through holes that can be used as button holes. In some embodiments, the fastening button of the mobile alarm device can be constructed and arranged to be inserted into any button hole of the footwear so that the mobile alarm device is fastened to the footwear.

The mobile alarm device can include housing that is made primarily of a durable material such as, for example, plastic, metal, wood, or any combination thereof. The fastening button can be made primarily of any durable material such as, for example, plastic, metal, wood, or any combination thereof. The mobile alarm device can include electronic components, such as a circuit board, control circuitry on the circuit board, one or more light sources and one or more sirens electrically connected to the control circuitry on the circuit board, and a first push button and a second push button mounted on the circuit board.

Referring to FIG. 1, the mobile alarm device 10 can be fastened to footwear 12. In some embodiments, the footwear 12 can include one or more button holes 16 that can receive a fastening button (e.g., 44 in FIG. 2). In some embodiments, the mobile alarm device 10 can include a housing 14, a first button cover 21 positioned at a first side 31 of the housing 14, and a second button cover 22 positioned at a second side 32 of the housing. The second side 32 can be adjacent to the first side 31 of the housing 14.

Figure 2:
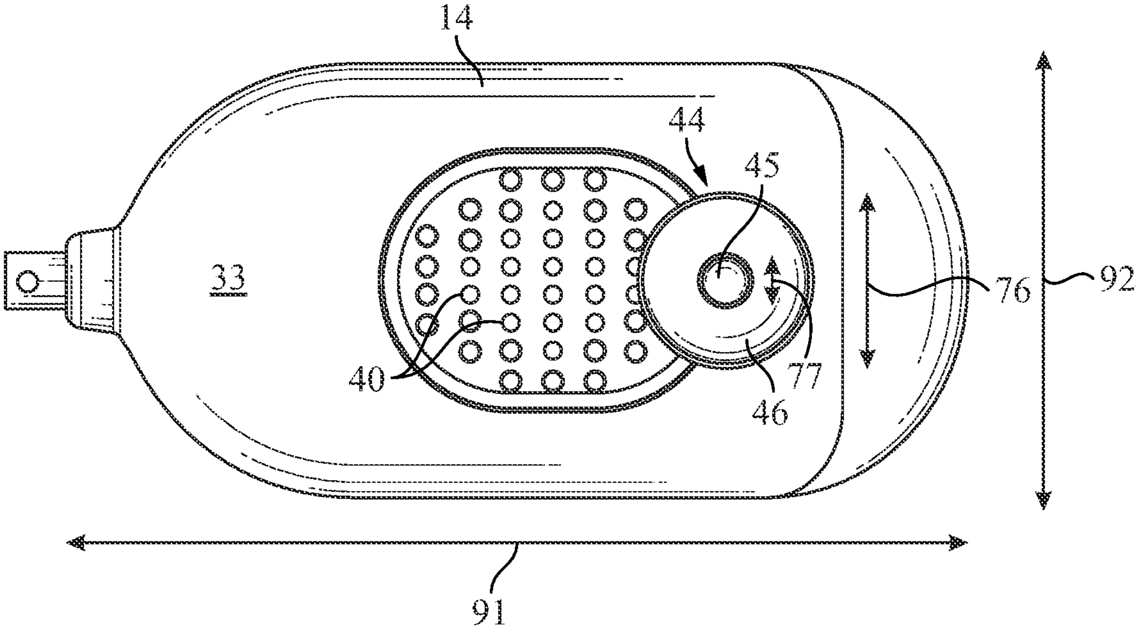
FIG. 2 illustrates a bottom side of a mobile alarm device unfastened from footwear, according to some embodiments disclosed herein.

Referring to FIG. 2, the mobile alarm device 10 can be unfastened from the footwear (e.g., 12 in FIG. 1) by pulling the fastening button 44 out of a button hole (e.g., 16 in FIG. 1) in the footwear. The fastening button 44 can be attached to a third side 33 opposite the first side 31 of the housing 14. The fastening button 44 can have a button head 46 that has a first diameter 76 that is larger than a second diameter (e.g., 78 in FIG. 1) of the button hole 16 in the footwear 12 to prevent the fastening button 44 from being released from the footwear 12. In some embodiments, the footwear 12 can be made out of material that is at least partially flexible so that the button head 46 can be inserted into the button hole 16. The fastening button 46 can have a shank 45 that has a third diameter 77 that is smaller or approximately the same size as the second diameter 78 of the button hole 16 in the footwear 12 in FIG. 1.

In some embodiments, the mobile alarm device 10 can include one or more through holes 40 at the third side 33 of the housing 14. In some embodiments, the one or more through holes 40 can be constructed and arranged to be positioned over one or more sirens (e.g., 59 in FIG. 4) to allow any sound produced by the one or more sirens to pass therethrough. In some embodiments, the housing 14 can have a length 91 that is smaller than 4 cm and a width 92 that is smaller than 3 cm.

Figure 3:
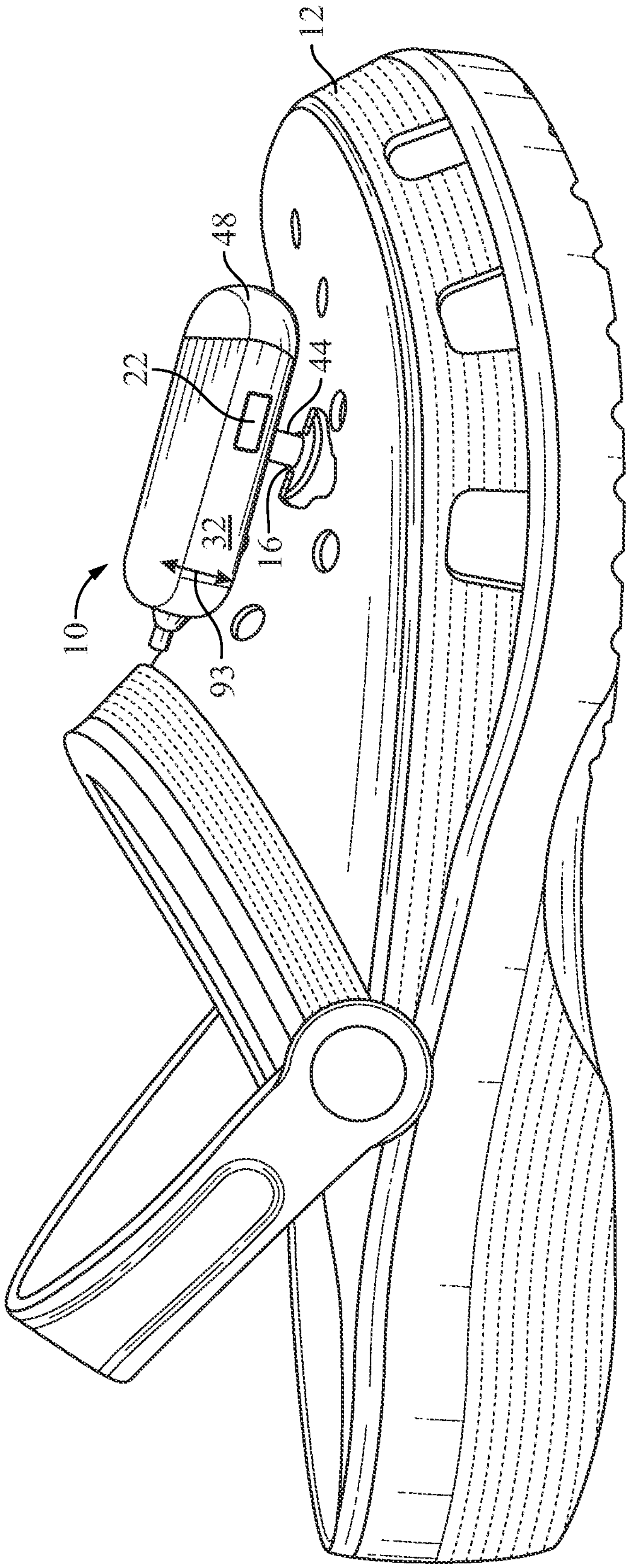
FIG. 3 illustrates a side view of a mobile alarm device fastened to footwear worn by a user, according to some embodiments disclosed herein.

In FIG. 3, the fastening button 44 can be constructed and arranged to fasten the mobile alarm device 10 to footwear 12. The fastening button 44 can fasten the mobile alarm device 10 (including the housing 14) to the footwear 12 by inserting the fastening button 44 into any of the one or more button holes 16. The second button cover 22 can be positioned at the second side 32 of the housing 10. In some embodiments, the mobile alarm device 10 can include a light cover 48 constructed and arranged to be positioned over one or more light sources (e.g., 56 in FIG. 4). The light cover 48 can be at least partially transparent to allow any light emitted from the one or more light sources to pass therethrough. In some embodiments, the housing 14 can have a thickness 93 that is smaller than 3 cm.

Figure 4:
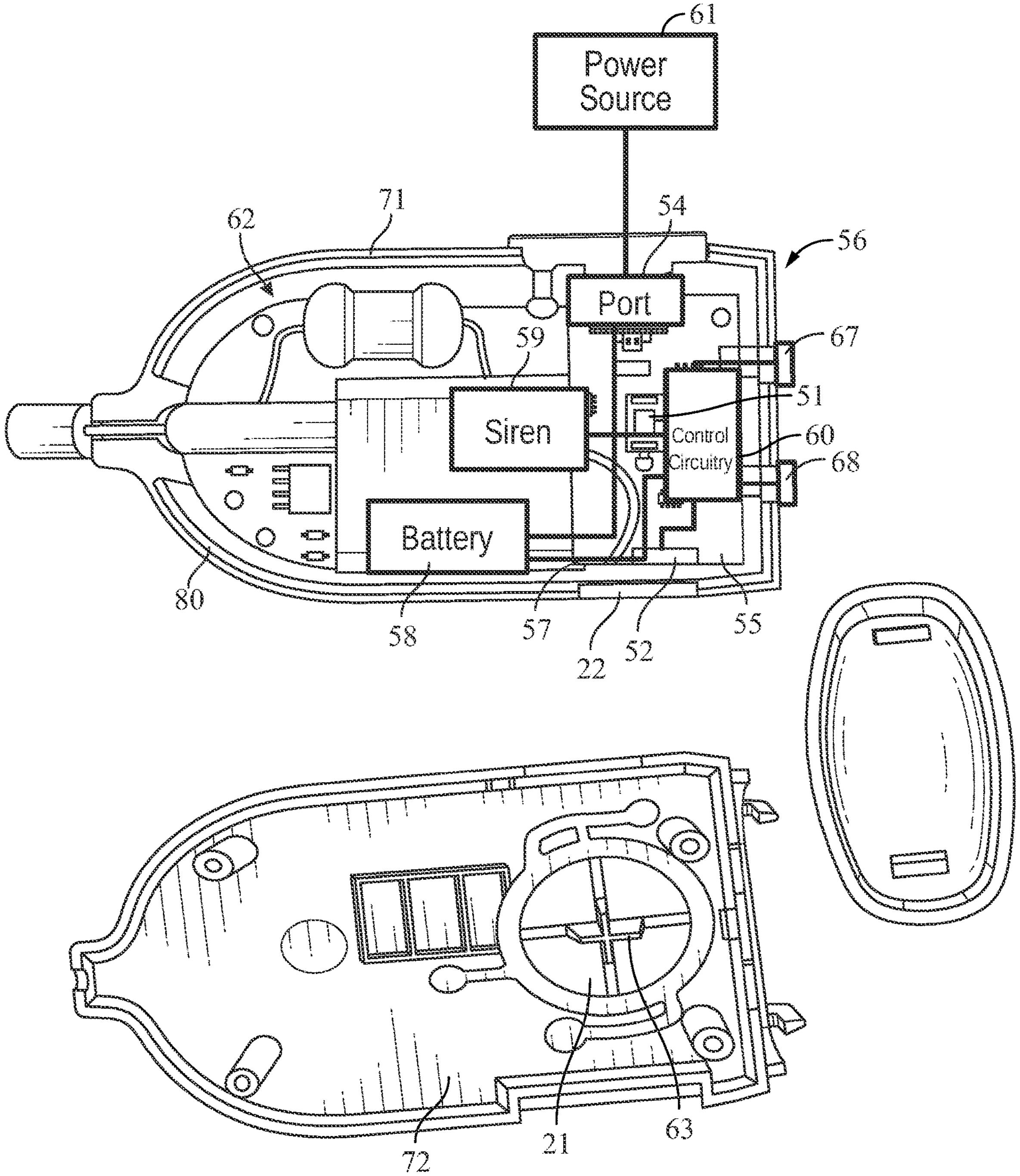
FIG. 4 illustrates the electronic components inside housing of a mobile alarm device, according to some embodiments disclosed herein.

Referring to FIG. 4, the mobile alarm device 10 can include a circuit board 55. In some embodiments, the mobile alarm device 10 can include one or more light sources 56 mounted on the circuit board 55. The one or more light sources 56 can include light-emitting diodes (LEDs). The one or more light sources 56 can be electrically connected to one or more batteries 58 by any of the one or more electrical connections 57. In some embodiments, the mobile alarm device 10 can include one or more sirens 59 electrically connected to the one or more batteries 58 by any of the one or more electrical connections 57.

In some embodiments, the mobile alarm device 10 can include at least a first push button 51 mounted on the circuit board 55. In some embodiments, the mobile alarm device 10 can include at least a second push button 52 mounted on the circuit board 55. In some embodiments, the first push button 51 can be electrically connected to at least a first light source 67 of the one or more light sources 56. In some embodiments, the second push button 52 can be electrically connected to at least a second light source 68 of the one or more light sources 56.

In some embodiments, the mobile alarm device 10 can include control circuitry 60 mounted on the circuit board 55. The control circuitry 60 can be electrically connected to at least the one or more light sources 56, the one or more sirens 59, or any combination thereof. In some embodiments, the control circuitry 60 can be configured to enter activation mode and activate any of the one or more light sources 56, the one or more sirens 59, or any combination thereof in response to determining that the first push button 51, the second push button 52, or a combination thereof was pushed. In some embodiments, the control circuitry 60 can be configured to enter deactivation mode and deactivate the one or more light sources 56, the one or more sirens 59, or any combination thereof in response to determining that the first push button 51, the second push button 52, or a combination thereof was pushed for an amount of time that meets a predetermined threshold after the control circuitry enters the activation mode.

When the one or more light sources 56 or the one or more sirens 59 are activated, the control circuitry 60 can be configured to provide the one or more light sources 56 or the one or more sirens 59 with power from the one or more batteries 58 so that the one or more light sources 56 can produce light or so that the one or more sirens 59 can produce sound. When the one or more light sources 56 or the one or more sirens 59 are deactivated, the control circuitry 60 can be configured to stop any power from the one or more batteries 58 from reaching the one or more light sources 56 or the one or more sirens 59. In some embodiments, the control circuitry 60 can include the first push button 51, the second push button 52, or a combination thereof.

In some embodiments, the control circuitry 60 can include any suitable digital logic circuitry such as, for example, one or more logic gates, one or more flip-flops, one or more multiplexers, one or more decoders, one or more comparators, one or more counters, one or more adders, any other digital logic circuitry for activating and deactivating the one or more light sources 56 and/or the one or more sirens 59, memory, or any combination thereof. Suitable logic gates can include one or more AND gates, one or more OR gates, one or more NOT gates, one or more NAND gates, one or more NOR gates, one or more XOR gates, or any combination thereof.

In some embodiments, the control circuitry 60 can include one or more processors such as, for example, a microprocessor, a micro-controller, a digital signal processor, dedicated logic, an application-specific integrated circuit (ASIC), a field programmable gate array (FPGA), an accelerator (e.g., an artificial intelligence (AI) accelerator or a cryptographic accelerator), any other suitable circuitry for activating and deactivating the one or more light sources 56 and/or the one or more sirens 59, or any combination thereof.

In some embodiments, the one or more batteries 58 can be rechargeable. The one or more batteries 58 can be recharged by electrically connecting a battery charging port 54 to a power source 61. The battery charging port 54 can be electrically connected to the one or more batteries 58.

The housing 14 can include a first housing portion 71 on which the circuit board 55 is mounted. In some embodiments, the circuit board 55, the control circuitry 60, the one or more sirens 59, the one or more batteries 58, the first push button 51, the second push button 52, the one or more electrical connections 57, or any combination thereof, can be positioned at least partially inside 62 the first housing portion 71. The housing 14 can include a second housing portion 72 that is constructed and arranged to attach onto the first housing portion 71 so that at least the circuit board 55, the control circuitry 60, the one or more sirens 59, the one or more batteries 58, the first push button 51, the second push button 52, the one or more electrical connections 57, or any combination thereof, are positioned inside the housing 14.

A stem portion 63 connected to the button cover 21 can be constructed and arranged to engage the first push button 51. The second button cover 22 can be constructed and arranged to engage the second push button 52. The first button cover 21 can be larger than the second button cover 22. One or more seals 80 can be arranged along the first housing portion 71. The one or more seals can be constructed and arranged to prevent any water from entering the housing 14 when the second housing portion 72 is attached onto the first housing portion 71.

Referring to FIG. 1, during use, the mobile alarm device 10 can be fastened to the footwear 12 while a user wears the footwear (e.g., while the user's foot 98 is inserted into the footwear 12). A user can push the first push button (e.g., 51 in FIG. 4) by pushing the first button cover 21 with any finger 97 of the user's hand 99 so that the first button cover 21 engages the first push button. A user can push the second push button (e.g., 52 in FIG. 4) by pushing the second button cover 22 with any finger 97 of the user's hand 99 so that the second button cover 22 engages the second push button.

Activating the one or more sirens 59 and/or activating any of the one or more light sources 56 can attract attention of any people located proximate to the user, which can discourage or prevent any potential attacker from threatening or causing physical harm to the user.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and are still considered to be within the scope of the invention.

According to variation 1, a mobile alarm device, can include: a housing; a fastening button attached to the housing, the fastening button being constructed and arranged to be inserted into a button hole in footwear to fasten the housing to the footwear; a circuit board mounted on the housing, the circuit board being positioned inside the housing; one or more light sources mounted on the circuit board; one or more sirens mounted on the circuit board, the one or more sirens positioned inside the housing; a first push button mounted on the circuit board, the first push button being electrically connected to at least a first light source of the one or more light sources and the one or more sirens; a second push button mounted on the circuit board, the second push button being electrically connected to at least a second light source of the one or more light sources; one or more batteries mounted on the circuit board, the one or more batteries electrically connected to the one or more light sources and the one or more sirens; control circuitry electrically connected to the first push button, the second push button, the one or more light sources, and the one or more sirens, the control circuitry positioned inside the housing, the control circuitry configured at least to: enter a deactivated mode; determine that the first push button was pushed; in response to entering the deactivated mode and in response to determining that the first push button was pushed, activate at least the first light source and the one or more sirens; enter an activated mode; in response to entering the activated mode, determine that the first push button was pushed for a first amount of time that meets a predetermined threshold; in response to determining that the first push button was pushed for a first amount of time that meets a predetermined threshold, deactivate the first light source and the one or more sirens.

Variation 2 can include the mobile alarm device of variation 1, further comprising: a first button cover constructed and arranged to engage the first push button; and a second button cover constructed and arranged to engage the second push button; wherein the first button cover is larger than the second button cover.

Variation 3 can include the mobile alarm device of variation 1, wherein the control circuitry is further configured to: determine that the second push button was pushed; in response to determining that the second push button was pushed, activate the second light source.

Variation 4 can include the mobile alarm device of variation 1, wherein the housing includes a plurality of through holes constructed and arranged to be positioned over the one or more sirens.

Variation 5 can include the mobile alarm device of variation 1, wherein the housing has a length that is smaller than 4 cm, wherein the housing has a width that is smaller than 3 cm, and wherein the housing has a thickness that is smaller than 3 cm.

Variation 6 can include the mobile alarm device of variation 1, wherein the one or more batteries are rechargeable.

Variation 7 can include the mobile alarm device of variation 1, further comprising one or more seals disposed along a first portion of the housing.

According to variation 8, a method for using the mobile alarm device of variation 1 can include: providing the mobile alarm device of variation 1, fastening the mobile alarm device to the footwear by inserting the fastening button into the button hole in the footwear.

Variation 9 can include the method of variation 8, further comprising: pushing the first push button while the mobile alarm device is fastened to the footwear and after the control circuitry enters the deactivated mode Variation 10 can include the method of variation 9, further comprising: pushing the first push button for a second amount of time that is larger than the predetermined threshold while the mobile alarm device is fastened to the footwear and after the control circuitry enters the activated mode.

Variation 11 can include the method of variation 8, further comprising: pushing the second push button while the mobile alarm device is fastened to the footwear and after the control circuitry enters the deactivated mode.

Variation 12 can include the method of variation 8, further comprising: unfastening the mobile alarm device from the footwear by pulling the fastening button out of the button hole in the footwear.

Variation 13 can include the method of variation 12, further comprising: charging the one or more batteries in the mobile alarm device by connecting the mobile alarm device to a power source.

According to variation 14, a mobile alarm device can include: a housing; a fastening button attached to the housing, the fastening button being constructed and arranged to be inserted into a button hole in footwear to fasten the housing to the footwear; a circuit board mounted on the housing; one or more light sources mounted on the circuit board; one or more sirens mounted on the circuit board; a first push button mounted on the circuit board, the first push button being electrically connected to at least a first light source of the one or more light sources and the one or more sirens; a second push button mounted on the circuit board, the second push button being electrically connected to at least a second light source of the one or more light sources; one or more batteries mounted on the circuit board, the one or more batteries electrically connected to the one or more light sources and the one or more sirens; control circuitry electrically connected to the first push button, the second push button, the one or more light sources, and the one or more sirens, the control circuitry configured at least to: enter a deactivated mode; determine that the first push button was pushed; in response to entering the deactivated mode and in response to determining that the first push button was pushed, activate at least the first light source and the one or more sirens; enter an activated mode; in response to entering the activated mode, determine that the first push button was pushed for a first amount of time that meets a predetermined threshold; in response to determining that the first push button was pushed for a first amount of time that meets a predetermined threshold, deactivate the first light source and the one or more sirens.

Variation 15 can include the mobile alarm device of variation 14, further comprising: a first button cover constructed and arranged to engage the first push button; and a second button cover constructed and arranged to engage the second push button; wherein the first button cover is larger than the second button cover.

Variation 16 can include the mobile alarm device of variation 14, wherein the control circuitry is further configured to: determine that the second push button was pushed; in response to determining that the second push button was pushed, activate the second light source.

Variation 17 can include the mobile alarm device of variation 14, wherein the housing includes a plurality of through holes constructed and arranged to be positioned over the one or more sirens.

Variation 18 can include the mobile alarm device of variation 14, wherein the housing has a length that is smaller than 4 cm, wherein the housing has a width that is smaller than 3 cm, and wherein the housing has a thickness that is smaller than 3 cm.

Variation 19 can include the mobile alarm device of variation 14, wherein the one or more batteries are rechargeable.

Variation 20 can include the mobile alarm device of variation 14, further comprising one or more seals disposed along a first portion of the housing.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for anyone of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible considering the above teachings without departing from the following claims.

What is claimed is:

1. A mobile alarm device, comprising:
- a housing;
- a fastening button attached to the housing, the fastening button being constructed and arranged to be inserted into a button hole in footwear to fasten the housing to the footwear;
- a circuit board mounted on the housing, the circuit board being positioned inside the housing;
- one or more light sources mounted on the circuit board;
- one or more sirens mounted on the circuit board, the one or more sirens positioned inside the housing;
- a first push button mounted on the circuit board, the first push button being electrically connected to at least a first light source of the one or more light sources and the one or more sirens;
- a second push button mounted on the circuit board, the second push button being electrically connected to at least a second light source of the one or more light sources;
- one or more batteries mounted on the circuit board, the one or more batteries electrically connected to the one or more light sources and the one or more sirens;
- control circuitry electrically connected to the first push button, the second push button, the one or more light sources, and the one or more sirens, the control circuitry positioned inside the housing, the control circuitry configured at least to:
- enter a deactivated mode;
- determine that the first push button was pushed;
- in response to entering the deactivated mode and in response to determining that the first push button was pushed, activate at least the first light source and the one or more sirens;
- enter an activated mode;
- in response to entering the activated mode, determine that the first push button was pushed for a first amount of time that meets a predetermined threshold;
- in response to determining that the first push button was pushed for a first amount of time that meets a predetermined threshold, deactivate the first light source and the one or more sirens.

2. The mobile alarm device of claim 1, further comprising:
- a first button cover constructed and arranged to engage the first push button; and
- a second button cover constructed and arranged to engage the second push button;
- wherein the first button cover is larger than the second button cover.

3. The mobile alarm device of claim 1, wherein the control circuitry is further configured to:
- determine that the second push button was pushed;
- in response to determining that the second push button was pushed, activate the second light source.

4. The mobile alarm device of claim 1, wherein the housing includes a plurality of through holes constructed and arranged to be positioned over the one or more sirens.

5. The mobile alarm device of claim 1, wherein the housing has a length that is smaller than 4 cm, wherein the housing has a width that is smaller than 3 cm, and wherein the housing has a thickness that is smaller than 3 cm.

6. The mobile alarm device of claim 1, wherein the one or more batteries are rechargeable.

7. The mobile alarm device of claim 1, further comprising one or more seals disposed along a first portion of the housing.

8. A method for using the mobile alarm device of claim 1, comprising:

providing the mobile alarm device of claim 1, fastening the mobile alarm device to the footwear by inserting the fastening button into the button hole in the footwear.

9. The method of claim 8, further comprising:

pushing the first push button while the mobile alarm device is fastened to the footwear and after the control circuitry enters the deactivated mode.

10. The method of claim 9, further comprising:

pushing the first push button for a second amount of time that is larger than the predetermined threshold while the mobile alarm device is fastened to the footwear and after the control circuitry enters the activated mode.

11. The method of claim 8, further comprising:

pushing the second push button while the mobile alarm device is fastened to the footwear and after the control circuitry enters the deactivated mode.

12. The method of claim 8, further comprising:

unfastening the mobile alarm device from the footwear by pulling the fastening button out of the button hole in the footwear.

13. The method of claim 12, further comprising:

charging the one or more batteries in the mobile alarm device by connecting the mobile alarm device to a power source.

14. A mobile alarm device, comprising:

a housing;

a fastening button attached to the housing, the fastening button being constructed and arranged to be inserted into a button hole in footwear to fasten the housing to the footwear;

a circuit board mounted on the housing;

one or more light sources mounted on the circuit board;

one or more sirens mounted on the circuit board;

a first push button mounted on the circuit board, the first push button being electrically connected to at least a first light source of the one or more light sources and the one or more sirens;

a second push button mounted on the circuit board, the second push button being electrically connected to at least a second light source of the one or more light sources;

one or more batteries mounted on the circuit board, the one or more batteries electrically connected to the one or more light sources and the one or more sirens;

control circuitry electrically connected to the first push button, the second push button, the one or more light sources, and the one or more sirens, the control circuitry configured at least to:

enter a deactivated mode;

determine that the first push button was pushed;

in response to entering the deactivated mode and in response to determining that the first push button was pushed, activate at least the first light source and the one or more sirens;

enter an activated mode;

in response to entering the activated mode, determine that the first push button was pushed for a first amount of time that meets a predetermined threshold;

in response to determining that the first push button was pushed for a first amount of time that meets a predetermined threshold, deactivate the first light source and the one or more sirens.

15. The mobile alarm device of claim 14, further comprising:

a first button cover constructed and arranged to engage the first push button; and a second button cover constructed and arranged to engage the second push button;

wherein the first button cover is larger than the second button cover.

16. The mobile alarm device of claim 14, wherein the control circuitry is further configured to:

determine that the second push button was pushed;

in response to determining that the second push button was pushed, activate the second light source.

17. The mobile alarm device of claim 14, wherein the housing includes a plurality of through holes constructed and arranged to be positioned over the one or more sirens.

18. The mobile alarm device of claim 14, wherein the housing has a length that is smaller than 4 cm, wherein the housing has a width that is smaller than 3 cm, and wherein the housing has a thickness that is smaller than 3 cm.

19. The mobile alarm device of claim 14, wherein the one or more batteries are rechargeable.

20. The mobile alarm device of claim 14, further comprising one or more seals disposed along a first portion of the housing.

* * * * *